United States Patent [19]
Parker

[11] Patent Number: 5,546,999
[45] Date of Patent: Aug. 20, 1996

[54] EXTERNAL TRANSMISSION FILTER ADAPTER

[75] Inventor: Zachary T. Parker, Huntington Beach, Calif.

[73] Assignee: Flo-Dynamics, Inc., Compton, Calif.

[21] Appl. No.: 416,335

[22] Filed: Apr. 4, 1995

Related U.S. Application Data

[63] Continuation-in-part of Ser. No. 348,614, Dec. 2, 1994, which is a continuation-in-part of Ser. No. 145,686, Oct. 29, 1993, Pat. No. 5,370,160, which is a continuation-in-part of Ser. No. 11,992, Feb. 1, 1993, abandoned.

[51] Int. Cl.$^6$ ............... B65B 1/04; B65B 3/04; B67C 3/02
[52] U.S. Cl. ............... 141/98; 141/59; 141/65; 184/15; 210/168
[58] Field of Search .................. 141/4, 5, 7, 59, 141/65, 98; 184/1.5, 106; 210/168

[56] References Cited

U.S. PATENT DOCUMENTS

| | | | |
|---|---|---|---|
| 3,513,941 | 5/1970 | Becnel | 184/1.5 |
| 3,566,912 | 3/1971 | Dunkelis | 137/493 |
| 3,784,011 | 1/1974 | Ward | 210/168 |
| 4,492,632 | 1/1985 | Mattson | 210/168 |
| 4,689,144 | 8/1987 | Holmes | 210/130 |
| 4,745,989 | 5/1988 | DiMatteo | 184/1.5 |
| 5,056,621 | 10/1991 | Trevino | 184/1.5 |
| 5,074,379 | 12/1991 | Batrice | 184/1.5 |
| 5,291,968 | 3/1994 | Brown | 184/1.5 |
| 5,318,080 | 6/1994 | Viken | 141/98 |
| 5,337,708 | 8/1994 | Chen | 123/198 A |

*Primary Examiner*—Henry J. Recla
*Assistant Examiner*—Timothy L. Maust
*Attorney, Agent, or Firm*—Fulwider Patton Lee & Utecht

[57] ABSTRACT

An external adapter includes an elongated housing formed with a pair of internal open ended longitudinal fluid passageways defining, respectively, a used fluid and an unused fluid passageway. The used fluid passageway is internally threaded at one end thereof for engagement with a mounting fitting formed on a transmission filter mount for vehicles with external transmission fluid filters. The opposite end of the used fluid passageway is threaded for engaging one end of a used fluid fitting which includes an opposite end for connection to a drain hose for withdrawing used fluid from the used fluid fitting. The unused fluid passageway includes a first end which aligns with at least one filtered fluid port on the filter mount when the adapter is engaged with the mounting fitting. The opposite end of the unused fluid passageway is threaded for engagement with an unused fluid fitting which includes an opposite end for connection to a supply hose for supplying unused fluid from an external fluid source to the unused fluid fitting.

9 Claims, 1 Drawing Sheet

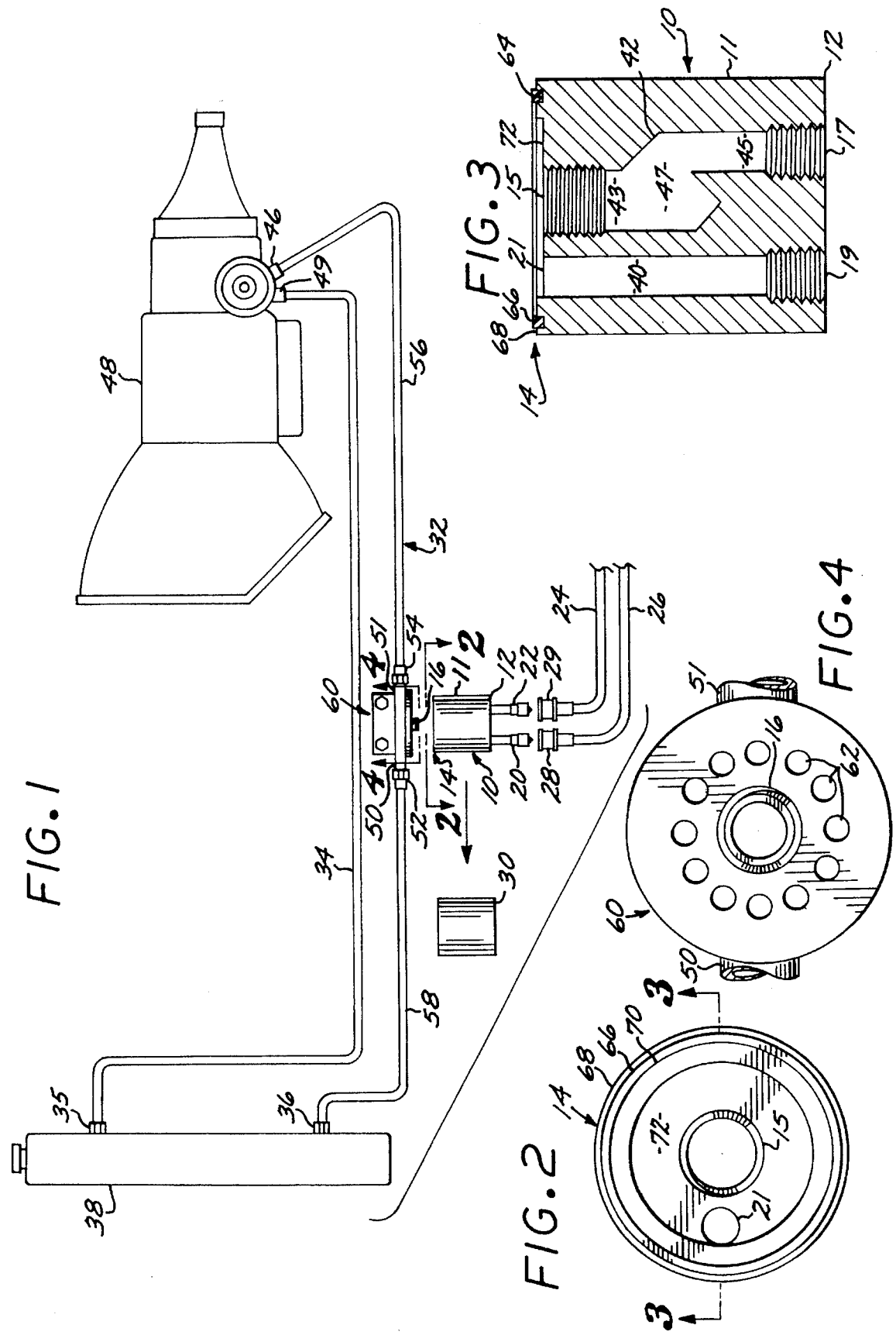

EXTERNAL TRANSMISSION FILTER ADAPTER

This application is a continuation-in-part of application Ser. No. 08/348,614, filed Dec. 2, 1994, which was a continuation-in-part of application Ser. No. 08/145,686 filed Oct. 29, 1993 and now U.S. Pat. No. 5,370,160, which was a continuation-in-part of application Ser. No. 08/011,992, filed Feb. 1, 1993, now abandoned.

BACKGROUND OF THE INVENTION

1. Field of the Invention

The subject invention relates to vehicle maintenance and, more particularly, to an apparatus for withdrawing and replenishing transmission fluid in an automatic transmission.

2. Description of the Prior Art

Automatic transmissions require transmission fluid because such fluid is employed to transmit torque within the transmission and is additionally employed to lubricate the internal components within such transmissions. Over time such fluid becomes less viscous and thus less efficient in lubricating such components. It is therefore desirable to periodically perform an exchange of fluid to maintain the viscosity of such fluid within the transmission and to maintain the cleanliness of the transmission and thereby increase the useful life of the transmission. A complete exchange of fluid is preferred so that the used fluid as well as undesirable foreign matter contained therein is completely removed and is replaced with new, more viscous fluid.

Automatic transmissions typically include transmission fluid filters which serve to aid in the removal of undesirable foreign matter from the transmission fluid. In most transmission systems the fluid filter is internally disposed within the transmission housing. However, certain transmission systems such as transmissions used in tractors sold under the trademark ALLISON incorporate external transmission fluid filters integrated into the transmission fluid cooler lines extending between the vehicle's transmission and the radiator. In addition, it has been known that in the coming years automobile manufacturers such as Ford, Chrysler, and General Motors will manufacture transmissions incorporating external transmission filters.

There has been a long standing need for a device which may efficiently perform a simultaneous, substantially complete exchange of transmission fluid in an automatic transmission while at the same time posing minimum risk to the transmission. The conventional method, still widely practiced today, is to replace the fluid housed in the pan of the transmission. The pan typically holds from 1 to 5 quarts of the total 7 to 15 quart capacity of the transmission. Thus emptying the pan and then adding that amount of new fluid only serves to dilute the used fluid with some 15%–25% of new fluid. Hence this conventional service is inefficient since it only serves to mix new fluid with a large quantity of used fluid. Furthermore, this service requires the removal of the transmission fluid pan from the transmission for emptying of the fluid therefrom and replacement of the pan on the transmission housing. This is a messy and time consuming process. Furthermore, the pan is often not replaced squarely over the pan seal or, on occasion, will trap small foreign obstacles in the seal area resulting in leakage.

More recently, there have been efforts to change all the fluid in an automobile's transmission by disconnecting a fluid tube and draining the fluid into a waste oil dump while manually pouring new fluid into the transmission dipstick hole. This procedure has proven to be inefficient, inadequate and so time consuming that it has failed to gain broad acceptance.

Another prior method involved disconnecting a transmission fluid cooler line and allowing one end of such cooler line carrying used fluid to drain freely, while the other end of the line was connected to a pressurized tank which injected unused fluid into the cooler line connected to the transmission. One major disadvantage associated with this method is that, in many instances, the rate at which fluid exits the transmission cannot be matched by the rate at which unused fluid is injected into the transmission because the transmission, due to internal resistances, cannot accept fluid at the same rate as the rate at which used fluid is flowed by the transmission pump into an unrestricted cooler line. As such, there is a risk that, because of unbalanced flow, the transmission pump may run short of fluid resulting in the fluid seals, rear bearings and other internal components of the transmission being exposed to damage due to the progressively diminishing level of fluid in the transmission during such a process. This difficulty is compounded by the fact that the flow resistance varies with the different models of transmissions.

Other work in this field has led to the proposal of a transmission changer including air pressurized tanks for supply and extraction of transmission fluid via the transmission cooling lines. A device of this type is shown in U.S. Pat. No. 5,318,080 to Viken issued on an application filed Oct. 25, 1991. This device suffers the shortcoming that it must be tied to an air pressure hose like an umbilical cord, is expense to manufacture and requires access to the vehicle transmission fluid plumbing lines.

In my prior U.S. Pat. No. 5,370,160, I disclose a transmission flushing device which breaks into the transmission cooling lines leading from the radiator. While providing an important solution to a long standing problem, that arrangement could be improved by providing an adaptor which would allow access to the flow stream from the transmission without the necessity of cutting into the cooling lines.

As such, it may be appreciated that there continues to be a need for an automatic transmission fluid exchanging device which provides convenient access to the transmission for simultaneous exchange of fluid, while at the same time posing minimum risk of damage to the transmission or tubing associated therewith. The instant invention addresses such needs.

SUMMARY OF THE INVENTION

Briefly and in general terms, the present invention provides an external adapter for accessing a transmission system exchanging transmission fluid in transmissions of the type incorporating transmission fluid filters mounted external to the transmission housing and accessible for each replacement. The filter adapter of the present invention comprises a generally cylindrical housing formed with a pair of open ended internal passageways defining respective unused fluid and used fluid passageways. The used fluid passageway includes a threaded first end defining a housing fitting terminating generally centrally at one longitudinal end of the housing for engagement with a mounting fitting formed on the vehicle external filter mount, the mounting fitting normally mounting a standard transmission filter thereon for the transfer of unfiltered fluid from the filter mount to the standard transmission filter. The unused fluid passageway includes a first end defining an unused fluid outlet which, when the housing and mounting fittings are engaged, aligns with at least one filtered fluid port on the filter mount for introducing unused fluid into the filter mount for the transmittal thereof to the transmission. The respective passageways are open on their opposite ends to define, respectively, a used fluid outlet and an unused fluid inlet for mounting respective used fluid and unused fluid fittings. The respective fittings may be coupled with respective used fluid and unused fluid hoses leading from a fluid exchange device for the respective withdrawal of used fluid from the used fluid passageway through the used fluid fitting and introduction of unused fluid into the unused fluid passageway through the unused fluid fitting for delivery thereof to the transmission so that a simultaneous, complete exchange of fluid in a transmission may be performed.

Other features and advantages of the invention will become apparent from the following detailed description, taken in conjunction with the accompanying drawings which illustrate, by way of example, the features of the invention.

DESCRIPTION OF THE DRAWINGS

FIG. 1 is a partially fragmented side view of an external adapter embodying the present invention in position for engagement with the mounting fitting of the vehicle's filter mount;

FIG. 2 is a sectional view, in enlarged scale, taken along the line 2—2 of FIG. 1;

FIG. 3 is a sectional view, in enlarged scale, taken along the line 3—3 of FIG. 2; and FIG. 4 is a fragmentary sectional view, in enlarged scale, taken along the line 4—4 of FIG. 1.

DETAILED DESCRIPTION OF THE PREFERRED EMBODIMENTS

In the following description, like reference numerals will be used to refer to like or corresponding elements in the different figures of the drawings. Referring now to the drawings, and particularly to FIG. 1, the present invention provides an external adapter, generally designated 10, which allows for external access to transmission fluid systems which include external transmission fluid filters such that a simultaneous withdrawal and replacement of transmission fluid in such transmissions may be performed. The external adapter comprises a generally cylindrical internally plumbed housing 11 formed with a pair of longitudinal open ended passageways 40 and 42 extending through such housing (FIG. 3). The passageway 42 defines a used fluid passageway and includes an internally threaded first end defining a housing fitting 15 for engagement with a threaded mounting fitting 16 extending from a vehicle filter mount, generally designated 60, such mounting fitting normally conducting unfiltered fluid from a transmission fluid cooler line, generally designated 32, to a standard transmission filter 30 mounted thereon for the filtering and return of such fluid. The housing fitting thus also serves as a used fluid inlet for accepting used fluid from the mounting fitting. In the preferred embodiment the used fluid passageway is internally threaded at its opposite end, such end defining a used fluid outlet 17 for receipt of a threaded male fitting defining a used fluid fitting 22 (FIG. 1). The passageway 40 defines an unused fluid passageway and is internally threaded at one end thereof, such end defining an unused fluid inlet 19 (FIG. 3) for threaded engagement with a male fitting defining an unused fluid fitting 20 (FIG. 1).

Thus the standard filter 30 normally mounted on the mounting fitting may be disengaged from such fitting and the external adapter of the present invention mounted thereon. The used and unused fluid fittings may then be coupled with respective fluid hoses leading from a fluid exchange to withdraw used fluid from the transmission while filling such transmission with unused fluid. The fluid exchanger may conveniently be of the type disclosed in the grandparent of this application, as depicted in my U.S. Pat. No. 5,370,160. Briefly, the apparatus in that parent shows respective used fluid and unused fluid tanks connected to the opposite ends of the respective used fluid and unused fluid hoses. An unused fluid pump device is included in the unused fluid hose to flow unused fluid stored in the unused fluid tank through the unused fluid hose to the unused fluid fitting while used fluid flowing through the used fluid fitting will be conducted through the used fluid hose to the used fluid tank so that a substantially complete, simultaneous exchange of the transmission fluid in the automatic transmission is performed.

Automatic transmissions typically include transmission fluid conduits external to the transmission itself, such as transmission fluid cooler lines which extend between the transmission and the vehicle's radiator for the flow of such fluid to the radiator for the cooling and return thereof to the transmission. The transmission includes an internal pump which flows heated fluid in the transmission through one of the cooler lines to the radiator where it is cooled and returned to the transmission via the other cooler line. As is shown in FIG. 1, one such cooler line, generally designated 32, extends between a cooler port 36 on the radiator 38 and a fluid inlet port 46 formed on the transmission 48 and thus serves to conduct cooled transmission fluid from the radiator to the transmission. In vehicles with external transmission fluid filters, such filters are typically incorporated into such a cooler line. Such incorporation typically includes a pair of fluid lines 50 and 51 formed at respective first ends thereof with respective compression couplings 52 and 54 and connected at their respective opposite ends to respective fluid ports of an internally plumbed filter mount, generally designated 60, for fluid communication between the respective fluid lines and the filter mount. Such cooler line 32 is normally made up of a transmission segment 56 and a radiator segment 58. The compression couplings are then securely mated to the exposed ends of the respective cooler segments 56 and 58.

Thus cooled, unfiltered fluid in the radiator segment 58 is flowed through the fluid line 50 and into the filter mount where it is directed to the mounting fitting 16 which normally has mounted thereon the standard fluid filter 30 to thereby conduct unfiltered fluid from the mounting fitting to the standard transmission filter. The filter mount is formed with an internal fluid passageway extending from a plurality of spaced apart filtered fluid ports 62 formed thereon (FIG. 4) to the fluid port on the filter mount connected to the fluid line 51 mated to the transmission segment 56. Thus fluid in the unused fluid passageway 40 may be directed through the filtered fluid port or ports aligned with such passageway when the adapter is mounted on the mounting fitting such that the unused fluid will be conducted through the internal fluid passageway in the filter mount and into the transmission segment of the cooler line to be introduced to the transmission through the port 46.

In the preferred embodiment, the used and unused fluid fittings 22 and 20 comprise quick disconnect couplers and are externally threaded at respective first ends thereof for threaded engagement with, respectively, the used fluid outlet 17 and the unused fluid inlet 19 formed on one longitudinal end 12 of the housing 11. Thus the fittings may be readily removed or replaced if they become worn or may be replaced with differently configured fittings to mate with differently configured used and unused fluid couplers 29 and 28. It will be appreciated that the respective fittings could also be integrally formed on the filter adapter 10 in fluid communication with the respective fluid passageways.

As is shown in FIGS. 2 and 3, the unused fluid passageway 40 projects through the housing 11 in a generally linear configuration and is disposed a predetermined distance from the central axis of the housing to terminate at the respective ends thereof in the off center unused fluid inlet 19 and outlet 21. The used fluid passageway 42 generally comprises a pair of substantially linear segments 43 and 45 which are offset and connect generally centrally within the housing in an enlarged in cross section segment 47 for fluid communication between the respective segments. As such the segment 43 is disposed generally centrally within the housing such that the housing fitting 15 is disposed centrally on the end 14 so that when such fitting is engaged with the mounting fitting 16 the filter adapter is properly mounted on and aligned with the filter mount 60. In addition the segment 45 is disposed off center a predetermined distance from the unused fluid passageway so that when the respective used and unused fittings 20 and 22 are threadably engaged to the used fluid outlet 17 and unused fluid inlet 19, the fittings will be spaced sufficiently far apart to provide sufficient space for the respective couplers 29 and 28 of the used fluid and unused fluid hoses 24 and 26 to engage such fittings as is shown in FIG. 1.

Referring to FIGS. 2 and 3, the housing 11 is formed on one end to complementally mate with the face of the filter mount 60. Formed concentrically about the central port 15 is an annular sealing ring formed with a flat face 68 having formed concentrically therein an annular sealing gasket gland 64 into which is nested an annular compressible gasket 66. Formed concentrically within the ring 68 is a recessed annular communication well 72 having the port 21 opening axially thereinto.

In the preferred embodiment, the housing 11 is formed of metal such as steel. It will be appreciated that the housing could be formed of another material, such as hard plastic or the like.

In use, when it becomes desirable to replace the transmission fluid in a transmission including an external transmission fluid filter, the standard transmission fluid filter 30 may be unscrewed from the mounting fitting 16 thereby exposing the fitting as well as the filtered fluid ports 62 on the filter mount 60. The threaded housing fitting 15 of the external adapter 10 may then be threadably engaged with the mounting fitting such that the gasket 66 projecting from the end 14 of the external adapter abuts against and serves to create a fluid tight engagement between the adapter and the filter mount. As such the unused fluid outlet 21 will be in position to deliver filtered fluid into the well 72 and to the ports 62 on the filter mount for the transmittal of unused fluid. The operator may then threadably engage the used and unused fluid fittings 22 and 20 with, respectively, the used fluid outlet 17 and the unused fluid inlet 19 thereby creating respective fluid paths from the mounting fitting to the used fluid fitting and from the unused fluid fitting to one or more of the filtered fluid ports on the filter mount. The used fluid fitting may then be releasably engaged by the coupler 28 formed at one end of the used fluid hose 26 which has an opposite end connected to a waste fluid tank (not shown) for disposal therein of the used fluid withdrawn through the used fluid fitting. The unused fluid fitting may be releasably engaged with the coupler 28 formed at one end of the unused fluid hose 26 which has an opposite end connected to a source of unused fluid such as that described in my U.S. Pat. No. 5,370,160 and a fluid flow device for flowing unused fluid from the source of unused fluid through the unused fluid hose (not shown).

The operator may then start the vehicle engine resulting in the activation of the transmission pump which initiates fluid flow through the cooler lines 34 and 32 and through the fluid line 50 into the filter mount 60 where it is directed through the mounting fitting 16 into the used fluid passageway 42. The used fluid will then flow through the used fluid passageway and used fluid fitting into the used fluid hose for transmittal thereof to the waste fluid tank. Simultaneous with the activation of the transmission pump, the operator may activate the fluid flow device resulting in fluid flow through the unused fluid hose and the unused fluid fitting into the unused fluid inlet 19. The fluid will then flow through the unused fluid passageway 40 and out the unused fluid outlet 21 into the well 72 to be introduced into one or more filtered fluid ports. The unused fluid is then directed through the internal passageway in the filter mount and out through the fluid line 51 into the transmission segment 56 of the cooler line 32 where it is conducted through the fluid port 46 and into the transmission, thereby performing a substantially simultaneous exchange of transmission fluid in the transmission.

When it is determined that the fluid exchange process has been completed, for example by observing the color of the used fluid being withdrawn through the sight glass incorporated in my exchange shown in my '160 patent and comparing that color with the color of the unused fluid, the operator may deactivate the transmission pump and the fluid flow device thereby discontinuing flow of fluid into and out of the external adapter 10. The operator may then unscrew the external adapter from the mounting fitting 16 and mount a new conventional transmission fluid filter onto the fitting.

From the foregoing, it will be appreciated that the external adapter of the present invention provides for the simultaneous withdrawal of used fluid from and delivery of unused fluid to a transmission with an external transmission filter, while at the same time posing minimum risk to the transmission.

While a particular form of the invention has been illustrated and described, it will also be apparent that various modifications can be made without departing from the spirit and scope of the invention. Accordingly, it is not intended that the invention be limited, except as by the appended claims.

What is claimed is:

1. An external adapter for mounting to a threaded mounting fitting of an external transmission filter mount including filtered and unfiltered fluid ports spaced a predetermined distance apart for connection with respective used and unused transmission fluid conduits and comprising:

an elongated housing formed on one end with a threaded housing fitting for complementarily engaging said mounting fitting to mount said housing from said mount;

an open ended longitudinal unused fluid passageway formed in said housing and including an outlet at said one end of said housing for, when said housing fitting is engaged with said mounting fitting, mating with said filtered port and including an opposite end defining an unused fluid inlet for receiving fresh transmission fluid;

an open ended longitudinal used fluid passageway formed in said housing and including an inlet at said one end of said housing for, when said housing and mounting fitting are engaged, mating with said unfiltered port to receive used fluid from said unfiltered port and including an opposite end defining a used fluid outlet; and used and unused fluid fittings in the respective said unused fluid inlet and used fluid outlet whereby said housing may be mounted from said filter mount by engaging said housing fitting with said mounting fitting and said used and unused fluid conduits may be connected with the respective said used and unused fittings so that used transmission fluid may be withdrawn from said unfiltered port through said used fluid passage to said used fluid conduit and unused transmission fluid introduced through said unused fluid conduit, through said unused fluid passage to said filtered fluid port.

2. The adapter of claim 1 wherein:

said housing is cylindrical in shape.

3. The adapter of claim 1 wherein:

said housing is constructed of steel.

4. The adapter of claim 1 further including:

an annular channel groove of predetermined depth formed on said one end of said housing; and an annular gasket for seating in said groove, said gasket being formed with a thickness exceeding said predetermined depth of said groove to project from said one end of said housing whereby when said housing fitting is engaged with said mounting fitting, said gasket is compressed against said filter mount to create a fluid tight seal between said adapter and said filter mount.

5. The adapter of claim 1 wherein:

said used and unused fluid fittings comprise quick disconnect couplers.

6. The adapter of claim 1 wherein:

said used fluid passageway comprises a pair of segments connected generally centrally within said housing such that said housing fitting is disposed centrally on said one end for engaging said mounting fitting and said used fluid outlet is disposed a predetermined distance from said unused fluid inlet so that said used and unused fluid conduits may engage the respective said used and unused fluid fittings connected to said used fluid outlet and unused fluid inlet.

7. The adapter of claim 1 wherein:

said housing is formed on said one end with a central port defining said filtered port and a concentric well, said inlet opening into said well.

8. The adapter of claim 1 that includes:

a sealing flange formed concentric with said central port configured with an open sealing gasket gland; and a compressible gasket in said gland.

9. A method of withdrawing used transmission fluid from a transmission including a transmission pump through a threaded mounting fitting on a filter mount external to said transmission for normally mounting a standard transmission fluid filter and of introducing fresh transmission fluid to said transmission through a plurality of filtered fluid ports formed on said filter mount spaced from said mounting fitting, including the following steps:

selecting an external adapter of the type having a housing formed with respective open ended used and unused fluid passageways and respective used and unused fluid fittings connected to respective first ends of said used and unused fluid passageways, said used fluid passageway including an internally threaded opposite end for engagement with said mounting fitting, said unused fluid passageway including an opposite end for alignment with at least one of said filtered fluid ports;

disengaging said standard transmission fluid filter from said filter mount;

engaging said internally threaded opposite end of said used fluid passageway with said threaded filter mount so that said unused fluid passageway aligns with at least one of said filtered fluid ports;

connecting the respective first ends of a used and an unused fluid hose to said used and unused fluid fittings, the respective said hoses including opposite ends for connection to respective used and unused fluid tanks, said unused fluid hose including a pump device for pumping fluid in said unused fluid tank through said unused fluid hose; and operating said transmission pump to flow transmission fluid from said mounting fitting through said used fluid passageway and said drain hose to said drain tank, while simultaneously actuating said pump device to flow fresh fluid through said unused fluid hose and unused fluid passageway into at least one of said filtered fluid ports.

* * * * *